United States Patent [19]

Pollock et al.

[11] Patent Number: 6,140,729
[45] Date of Patent: Oct. 31, 2000

[54] ELECTRICAL MACHINES

[75] Inventors: Charles Pollock, Alcester; John David Wale, Coventry; Mike Barnes, Sale, all of United Kingdom

[73] Assignee: University of Warwick, Conventry, United Kingdom

[21] Appl. No.: 09/230,680

[22] PCT Filed: Jul. 28, 1997

[86] PCT No.: PCT/GB97/02019

§ 371 Date: Mar. 29, 1999

§ 102(e) Date: Mar. 29, 1999

[87] PCT Pub. No.: WO98/05112

PCT Pub. Date: Feb. 5, 1998

[30] Foreign Application Priority Data

Jul. 30, 1996 [GB] United Kingdom .................. 9615950

[51] Int. Cl.[7] .................................................. H02K 17/00
[52] U.S. Cl. ...................... 310/166; 310/168; 310/162; 310/261; 310/68 R; 318/138; 318/166; 318/254
[58] Field of Search .................................. 310/168, 162, 310/261, 68 R, 166; 318/138, 166, 254, 696, 701

[56] References Cited

U.S. PATENT DOCUMENTS

| 5,459,385 | 10/1995 | Lipo et al. ............................... 318/701 |
| 5,825,113 | 10/1998 | Lipo et al. ............................... 310/181 |
| 5,844,343 | 12/1998 | Horst ....................................... 310/184 |
| 5,866,964 | 2/1999  | Li ............................................ 310/198 |
| 5,880,549 | 3/1999  | Chiba et al. ............................ 310/168 |
| 5,969,454 | 10/1998 | Pengov et al. .......................... 310/162 |

FOREIGN PATENT DOCUMENTS

| 0695020 | 7/1994  | European Pat. Off. . |
| 2735919 | 12/1996 | Germany . |
| 18027   | 1/1902  | United Kingdom . |
| 554827  | 7/1943  | United Kingdom . |
| 9638903 | 12/1996 | WIPO . |

OTHER PUBLICATIONS

M. Barnes et al., European Power Electronics and Drives Association, pp. 1,427–1,430, XP000537561 (1995), "Two Phase Switched Reluctance Drive with New Power Electronic Converter for Low Cost Applications".

J.D. Wale et al., 27th Annual IEEE Power Electronics Specialists Conference, vol. 2, Jun. 1996, pp. 1798–1803, "Novel Converter Topologies for a Two–Phase Switched Reluctance Motor with Fully Pitched Windings".

H.R. Bolton et al., IEE Proceedings–B, 137 (1990) Jan., No. 1, Part B, "Performance Prediction of Laws's Relay Actuator".

K.F. Raby, The British Thomson–Houston Company Limited, Rugby, England, Engineering Department, Technical Monograph, TMS 755, (1950), "Inductor Alternators for IO KC/S".

*Primary Examiner*—Nestor Ramirez
*Assistant Examiner*—Thanh Lam
*Attorney, Agent, or Firm*—Renner, Otto, Boisselle & Sklar LLP

[57] ABSTRACT

An electrical machine comprises a four-pole stator 2 provided with a field winding 10 and an armature winding 11, each of the windings 10, 11 being split into two coils 22, 23 or 24, 25 closely coupled and wound so that diametrically opposite portions of both coils are disposed within diametrically opposite stator slots. A two-pole rotor (not shown) without windings is rotatable within the stator 2, and a circuit is provided for energising the armature coils 24 and 25 when direct current is supplied to terminals 26 and 27 of the circuit. Switches 28 and 29 in series with the coils 24 and 25 are switched alternately to effect alternate energisation of the coils 24 and 25 so as to generate, as a result of the opposite winding of the coils, magnetomotive forces in opposite directions. Since each of the closely coupled coil 24 and 25 generates a magnetomotive force in a respective direction, each coil needs to be energised with current in only one direction so that a relatively simple excitation circuit can be used.

17 Claims, 5 Drawing Sheets

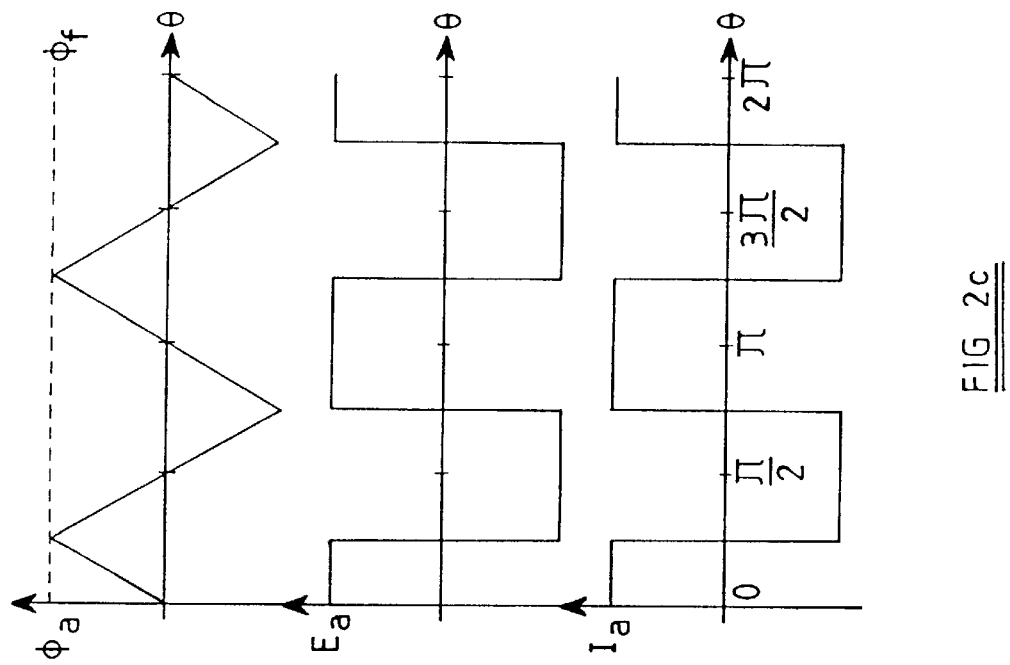
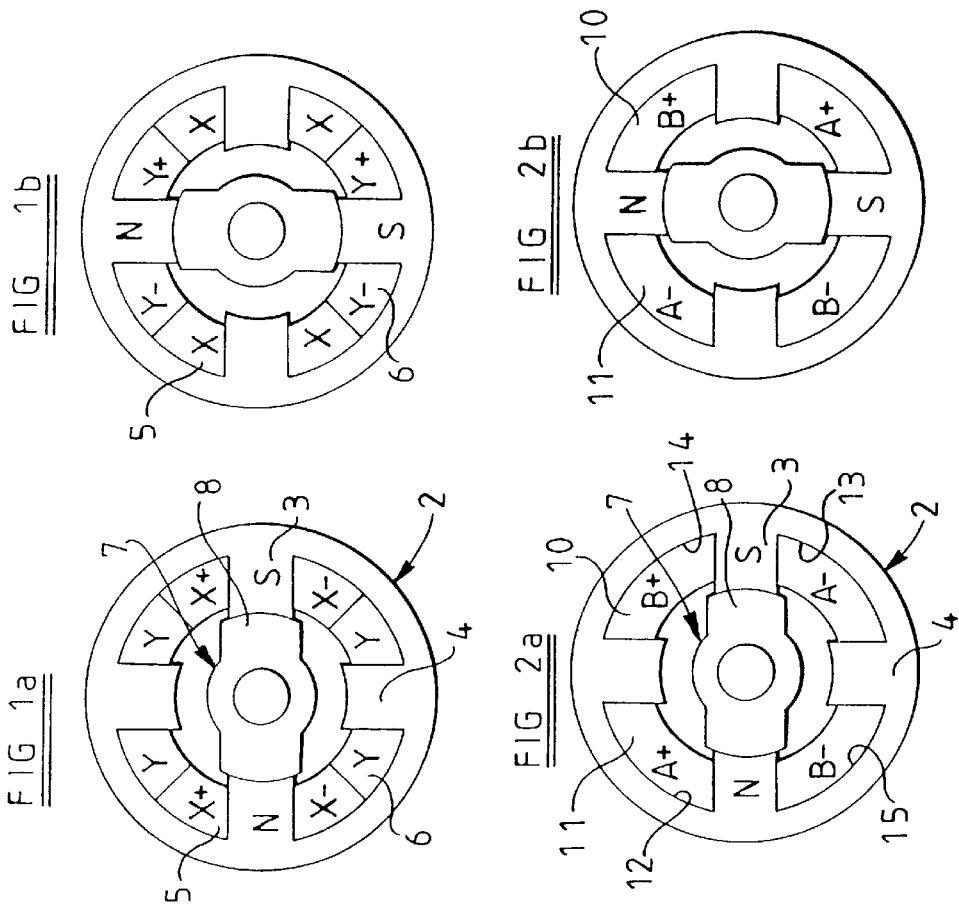

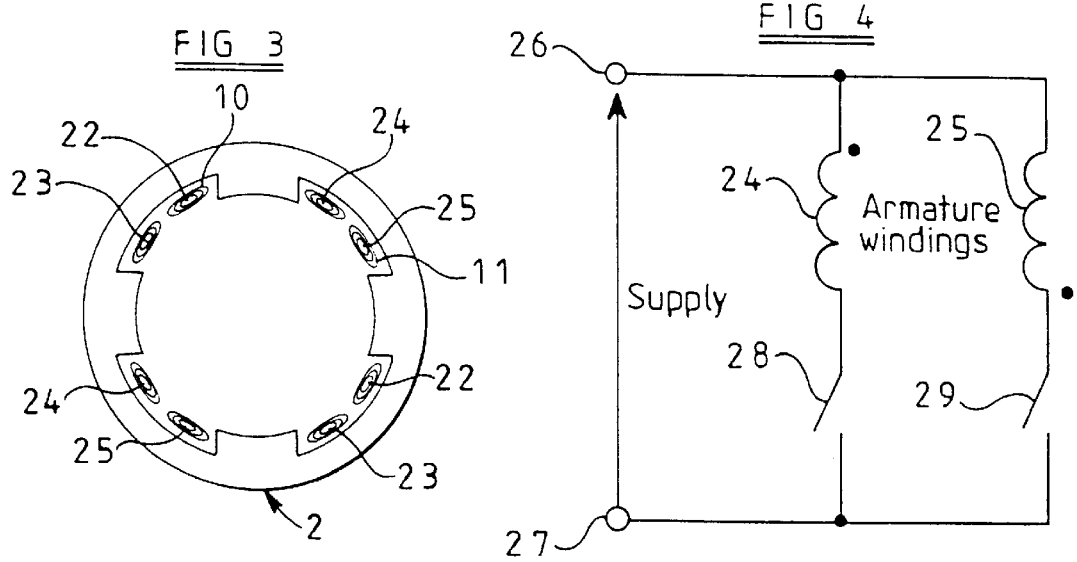
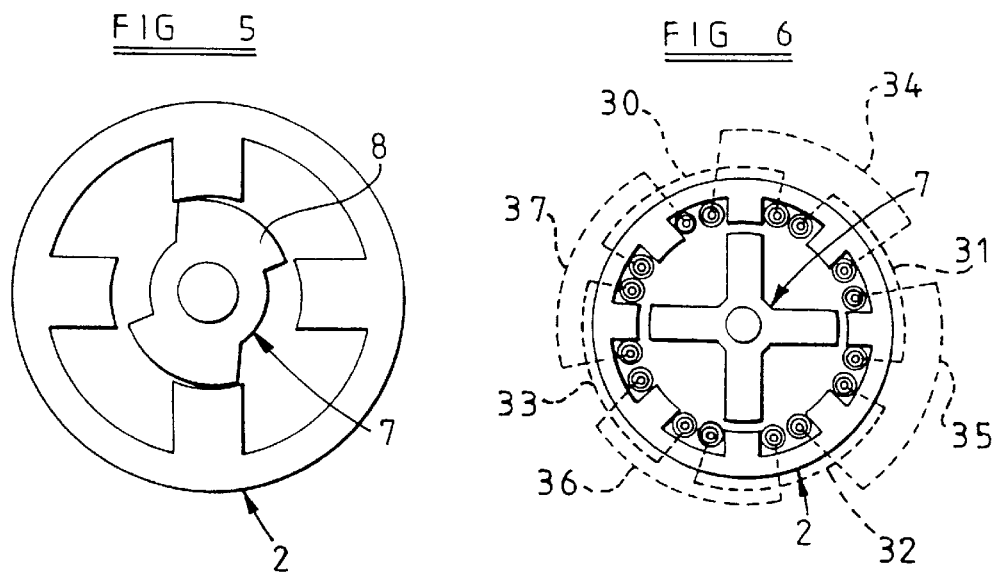
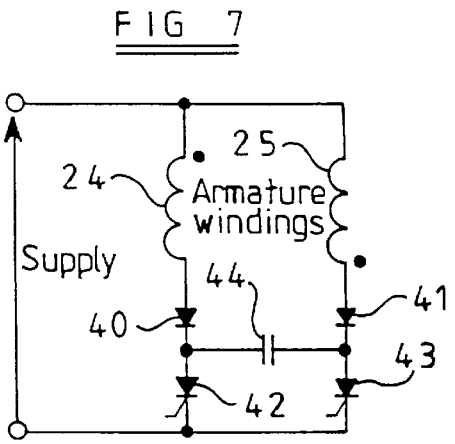

ELECTRICAL MACHINES

FIELD OF THE INVENTION

This invention relates to electrical machines, and is concerned more particularly, but not exclusively, with electrical motors.

DESCRIPTION OF THE RELATED ART INCLUDING INFORMATION DISCLOSED UNDER 37 CFR 1.97 AND 1.98

FIG. 1 shows a conventional two-phase variable reluctance motor comprising a stator 2 having two pairs 3, 4 of oppositely disposed inwardly directed salient poles provided with two pairs 5, 6 of energising windings corresponding to the two phases, and a rotor 7 having a single pair 8 of oppositely disposed outwardly directed salient poles without windings. Each of the four energising windings is wound about its corresponding pole, as indicated by the symbols Y—Y denoting two diametrically opposite portions of each winding of the winding pair 6 and the symbols X—X denoting two diametrically opposite portions of each winding of the winding pair 5. An excitation circuit (not shown) is provided for rotating the rotor 7 within the stator 2 by energising the stator windings in synchronism with rotation of the rotor so that torque is developed by the tendency of the rotor 7 to arrange itself in a position of minimum reluctance within the magnetic field produced by the windings, as will be described in more detail below. Such a variable reluctance motor offers the advantage over a conventional wound rotor motor that commutator brushes, which are wearing parts, are not required for supply of current to the rotor. Furthermore the fact that there are no conductors on the rotor and that high-cost permanent magnets are not required provides other advantages.

The symbols + and − in diagrams (a) and (b) in FIG. 1 show the directions of current flow in the windings in the two modes of excitation in which the rotor 7 is attracted either to the horizontal position or to the vertical position as viewed in the figure. It will be appreciated that rotation of the rotor 7 requires alternate energisation of the winding pairs 5 and 6, preferably with only one winding pair 5 or 6 being energised at a time, and with the current usually being supplied to each winding pair 5 or 6 in one direction during such energisation. However the windings can only be energised for a maximum of half the time per revolution if useful torque is to be produced, so that highly efficient utilization of the magnetic circuit is not possible with such a motor.

By contrast a fully pitched two-phase variable reluctance motor, as described by J. D. Wale and C. Pollock, "Novel Converter Topologies for a Two-Phase Switched Reluctance Motor with Fully Pitched Windings", IEEE Power Electronics Specialists Conference, Braveno, June 1996, pp. 1798–1803 and as shown in FIG. 2 (in which the same reference numerals are used to denote like parts as in FIG. 1), comprises two windings 10 and 11 having a pitch which is twice the pole pitch of the motor, that is 180° in the example illustrated, and disposed at 90° to one another. The winding 11 may be wound so that one part of the winding on one side of the rotor 7 fills a stator slot 12 defined between adjacent poles of the pole pairs 3, 4, and another part of the winding 11 on the diametrically opposite side of the rotor 7 fills a stator slot 13 defined between two further adjacent poles of the pole pairs 3, 4. The winding 10 has corresponding parts filling diametrically opposed stator slots 14 and 15. Thus the two windings 10 and 11 span the width of the motor with the axes of the windings 10, 11 being at right angles to one another.

Furthermore two modes of excitation of such a motor corresponding to the horizontal and vertical positions of the rotor 7 are shown in diagrams (a) and (b) of FIG. 2 from which it will be appreciated that both windings 10, 11 are energised in both modes of excitation, but that, whereas the direction of current flow in the winding 10 is the same in both modes, the direction of current flow in the winding 11 changes between the two modes. Since current is supplied to both phase windings 10, 11 in both modes and since each winding 10 or 11 occupies half the total stator slot area, such a system can achieve 100% utilisation of its slot area. This contrasts with the 50% utilisation achieved with the conventional wound variable reluctance motor described above in which only one phase winding is energised at a time. Furthermore, since there is no requirement for the direction of current in the winding 10 to change, the winding 10, which may be termed the field winding, can be supplied with direct current without any switching which leads to simplification of the excitation circuit used. However the winding 11, which may be termed the armature winding, must be energised with current which alternates in synchronism with the rotor position so as to determine the changing orientation of the stator flux required to attract the rotor alternately to the horizontal and vertical positions. The need to supply the armature winding with alternating current in such a motor can result in an excitation circuit of high complexity and cost.

J. R. Surano and C-M Ong, "Variable Reluctance Motor Structures for Low-Speed Operation", IEEE Transactions on Industry Applications, Vol. 32, No. 2, March/April 1996, p.p. 808–815 and UK Patent No. 2262843 also disclose fully pitched two-phase variable reluctance motors. The motor disclosed in UK Patent No. 2262843 is a three-phase variable reluctance motor having three windings which must be energised with current in synchronism with rotation of the rotor so that such a motor requires an excitation circuit of high complexity.

It is an object of the invention to provide an electrical machine of novel type which is of high efficiency and is capable of being produced at low cost.

BRIEF SUMMARY OF THE INVENTION

According to the present invention there is provided an electrical machine comprising a rotor without windings, a stator having poles and armature windings wound with a pitch corresponding to a plurality of pole pitches, the stator also including field magnet means for generating a magnetomotive force in a direction extending transversely of the magnetomotive force generated by the armature windings, and circuit means connected to the armature windings, wherein the armature windings comprise at least two coils which are closely coupled magnetically and which have active portions at substantially the same angular orientations with respect to the stator so that the currents in the coils vary in synchronism with rotation of the rotor in such a manner that periods in which a magnetomotive force in one direction is generated by current flow in one of the coils alternate with periods in which a magnetomotive force in the opposite direction is generated by current flow in another of the coils.

It is a particularly advantageous feature of the invention that the armature winding is made up of two closely coupled coils allowing each coil to be used for generating a magnetomotive force in a respective direction, and thus enabling each coil to be energised with current in only one direction so that relatively simple excitation circuitry can be used in order to minimise the number of circuit components and to thereby limit the cost.

BRIEF DESCRIPTION OF THE SEVERAL VIEWS OF THE DRAWINGS

In order that the invention may be more fully understood, reference will now be made, by way of example, to the accompanying drawings, in which:

FIGS. 1 and 2 are explanatory diagrams showing a conventional two-phase variable reluctance motor and a fully pitched two-phase variable reluctance motor, with the two excitation modes (a) and (b) being shown in each case;

FIG. 2C shows idealised waveforms for the field flux and armature flux, back-emf and current in use of such a machine;

FIGS. 3 and 4 are explanatory diagrams showing the stator windings of a first embodiment of the invention;

FIG. 5 is a diagram showing an asymmetrical rotor for self-starting which may be used in the first embodiment of the invention;

FIG. 6 is a diagram showing a second embodiment of the invention;

FIGS. 7 to 14 show various circuit arrangements for energising the stator windings, FIG. 9 showing a timing diagram for the four thyristors in the circuit arrangement of FIG. 8.

DETAILED DESCRIPTION OF THE INVENTION

Figure 8:
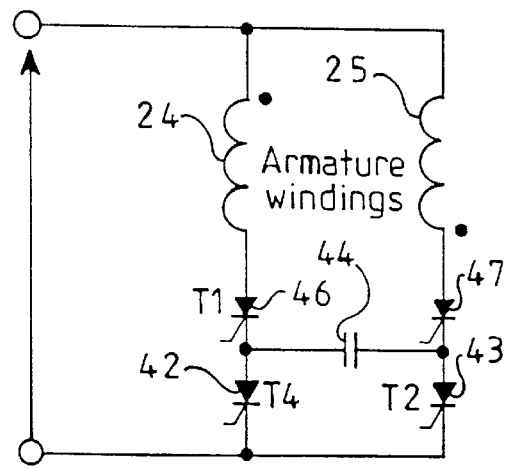

FIG. 2C shows idealised waveforms for the constant field flux $\phi_f$ and the varying armature flux $\theta_a$ as a function of the angular position e of the rotor 7 of the motor of FIG. 2 (or alternatively of a generator of similar construction), as well as the armature back-emf $E_a$ and armature current $I_a$ which vary with the rotor position. Of course, in practice, the actual waveforms obtained will differ substantially from these idealised waveforms due to various perturbing influences, as will be well understood to those skilled in the art. The field winding 10 receives a constant excitation current during operation so that its flux is substantially constant, whereas the flux linking the armature winding 11 is bipolar and changes from a positive maximum to a negative minimum every 90° of rotation, with the result that a square wave back-emf is induced in the armature winding 11. These characteristics are similar to those observed in use of a conventional four-pole stator DC machine.

If an assumption is made that the reluctance of the magnetic path seen by the windings is constant with rotor position, as can be achieved by use of a rotor with a large pole width such that the overlap with two adjacent stator poles remains substantially constant (as will be referred to further below with reference to FIG. 15), it follows that the field flux $\phi_f$ will also remain constant and that there is no possibility of negative torque generation from the field alone. The flux linking the armature winding 11 can then be assumed to vary linearly from its maximum positive value to its maximum negative value as the rotor is rotated, with two cycles being completed for each revolution of the rotor. If a further assumption is made that not all of the field flux links the armature winding 11, thus requiring the inclusion of a coupling coefficient k, an expression for the induced emf in the armature winding 11 can be obtained by considering the rate of change of flux with respect to time (Faraday's law).

An approximate square emf waveform would result from this, the mathematical description of such a waveform for a four-pole motor as shown in FIG. 2 being as follows if the speed of rotation ω is considered to be constant:

$$E_a = k \frac{4}{\pi} \phi_f N_a \omega$$

where $N_a$ is the number of turns of the armature winding 11.

The following expression for the field flux may then be substituted into this equation:

$$\phi = \frac{N_f I_f}{\mathcal{R}}$$

where $N_f$ and $I_f$ are the number of turns and the current of the field winding 10 and $\mathcal{R}$ is of turns and the current of the field winding 10 and $\mathcal{R}$ is the reluctance which is considered to be substantially constant with the rotor position.

The following expression is thereby obtained:

$$E_a = \frac{4k}{\pi \mathcal{R}} N_a N_f I_f \omega$$

The torque T can then be derived from the expression:

$$T = \frac{E_a I_a}{\omega}$$

where $I_a$ is the current in the armature winding 11.

By assuming that the current waveform is a square wave and that it is synchronised with the back-emf waveform as shown in FIG. 2A in order to produce optimum output power, the torque may be expressed as:

$$T = \frac{4k}{\pi \mathcal{R}} N_f I_f N_a I_a$$

Thus, according to this very simplified analysis, the torque is proportional to the product of the field and armature currents if the reluctance is considered to be substantially constant.

By comparison the back-emf $E_a$ in a conventional DC motor can be expressed as:

$$E_a = K_a \theta_f \omega$$

where $$K_a = \frac{N_a p}{\pi}$$

where p represents the number of poles of the stator.

Thus, where the DC motor is a 4-pole motor, the back-emf may be expressed as:

$$E_a = \frac{4}{\pi} \phi_f N_a \omega$$

which is similar to the expression for the back-emf in the armature winding 11 apart from the exclusion of the coupling coefficient k which is not normally expressed in the DC motor equation.

Furthermore the torque developed by the DC motor is defined by the expression:

$$T = K_a \phi_f I_a$$

and this can then be expanded as:

$$T = \frac{4}{\pi R} N_f I_f N_a I_a$$

which again is similar to the expression previously derived apart from the exclusion of the coupling coefficient k.

This simplified analysis has shown that there is considerable similarity between the operation of this machine and the conventional d.c. machine.

The first embodiment shown in FIG. 3 comprises a two-phase motor having a four-pole stator 2 provided with a field winding 10 and an armature winding 11, each of the windings 10, 11 being split into two coils 22, 23 or 24, 25 closely coupled and wound so that diametrically opposite portions of both coils are disposed within diametrically opposite stator slots. A similarly wound stator could be provided within a corresponding generator in accordance with the invention.

FIG. 4 shows a generalised circuit diagram for energising the armature coils 24 and 25. The coils 24 and 25 are connected within the circuit so that direct current supplied to the terminals 26 and 27 flows through both coils 24 and 25 in the same direction so as to generate, as a result of the opposite winding of the coils, magnetomotive forces in opposite directions, switches 28 and 29 in series with the coils 24 and 25 being switched alternately to effect alternate energisation of the coils 24 and 25 so as to provide the required magnetomotive forces acting in opposite directions. In a generator it will be appreciated that a similar circuit may be provided in order to supply a direct current output at the terminals 26 and 27.

In the first embodiment utilising a four-pole stator 2 the rotor 7 may have two poles 8 (or alternatively six poles) in which case, as shown in FIG. 5, the rotor poles may be asymmetric in shape in order to guarantee self-starting from rest without the need for an auxiliary starter. In the absence of such rotor asymmetry, there will be certain positions of the rotor 7 in which starting of rotation of the rotor 7 cannot be effected by simply energising the stator coils.

The second embodiment shown in FIG. 6 comprises a two-phase motor in which the stator 2 has eight poles and the rotor 7 has four poles (which, although shown symmetrically in this figure, would normally be of asymmetric form). In this case four field coils 30, 31, 32 and 33 and four armature coils 34, 35, 36 and 37 are provided, each of the coils being wound so that it spans two pole pitches. The armature coils 34, 35, 36 and 37 may be connected together in pairs with the coils of each pair being connected together in series or in parallel so as to form the equivalents of the coils 24 and 25 in the excitation circuit diagram of FIG. 4. Since the flux linking each of the coils 34, 35, 36 and 37 is the same, the coils may be connected together in any required manner in the circuit provided that they are interconnected in such a manner as to generate the required magnetomotive forces in opposite directions in the two excitation modes. It would be usual to expect that the armature coils 34, 35, 36, 37 would be connected together in pairs to produce the coils 24 and 25 of FIG. 4 so that energisation of the coil 24 or 25 would cause current to flow in all four armature slots. It is also possible for the armature and/or field coils to be wound in bifilar fashion with two parallel strands of wire, in order to provide magnetically well coupled armature circuits. However such an arrangement may lead to unacceptably low isolation voltage between the armature circuits.

Alternatively there may be only two field coils, for example 30 and 32, each spanning two pole pitches but arranged to fill the appropriate slots of the stator 2 such that there is no requirement for the field coils 31 and 33. Such a winding may be termed "a consequent pole winding". A similar arrangement can be used for the armature winding in which case the coils 34 and 36 may be omitted and instead the coils 35 and 36 may each comprise two closely coupled coils.

FIG. 7 shows a possible excitation circuit for energising the armature coils 24 and 25 in the first embodiment. In this circuit a diode 40, 41 and thyristor 42, 43 are connected in series with each coil 24, 25, and a commutation capacitor 44 is connected between the interconnection point of the diode 40 and thyristor 42 and the interconnection point of the diode 41 and thyristor 43. In this circuit the thyristors 42 and 43 are alternately switched by a timing signal dependent on the angular position of the rotor as sensed by a position detector, for example a single bit optical position sensor for optically detecting markings applied to the rotor shaft so as to provide a change of state at each 90° of rotor rotation. Turning on of the thyristor 43 in response to such a timing signal during current flow through the coil 24, diode 40 and thyristor 42 when the thyristor 42 is conducting will result in charging of the capacitor 44 by the current flowing through the coil 24 and will thereby force the current through the thyristor 42 to zero in order to turn the thyristor 42 off. Corresponding current flow through the coil 25, the diode 41 and the thyristor 43 as a result of turning on of the thyristor 43 will continue until turning on of the thyristor 42 by a further timing signal forces the thyristor 43 to be turned off. The diodes 40 and 41 prevent the capacitor 54 from discharging through the coils 24 and 25. The commutation of the thyristors 42 and 43 is initiated at fixed angles throughout the speed range, resulting in a simple control circuit. In a more advanced circuit the angles could be variable. However, since current will flow for a short time in both coils 24 and 25 after each switching operation, the efficiency of the system will be compromised by the fact that the magnetomotive forces generated by such current flow in both coils will counteract one another during this time, thus seriously reducing the available output and causing resistive losses.

Figure 9:
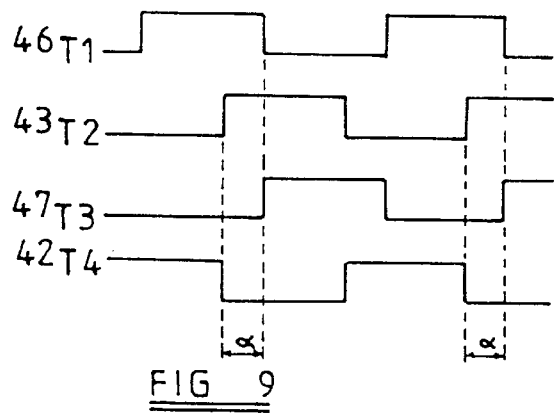

FIG. 8 shows an alternative excitation circuit in which two additional thyristors 46 and 47 are provided in place of the diodes 40 and 41 of FIG. 7. In this case turning on of the thyristor 43 results in forced commutation of the thyristor 42 (or alternatively turning on of the thyristor 42 results in forced commutation of the thyristor 43) without allowing current to build up in the coil 25 (or coil 24) until thyristor 47 (or 46) is turned on. FIG. 9 is a timing diagram showing the switching of the thyristors 46, 43 and 47, 42. As the phase difference a is increased the rotation of the rotor will tend to slow down as less power is delivered to the coils 24, 25. In this case it is preferable for the field winding 10 to be connected in series with the coils 24, 25 so that the average current in the field winding will also be reduced. The capacitor 44 may need to be pre-charged by an external circuit with a polarity appropriate to ensure effective commutation of the thyristors after the first conduction cycle.

Figure 10:
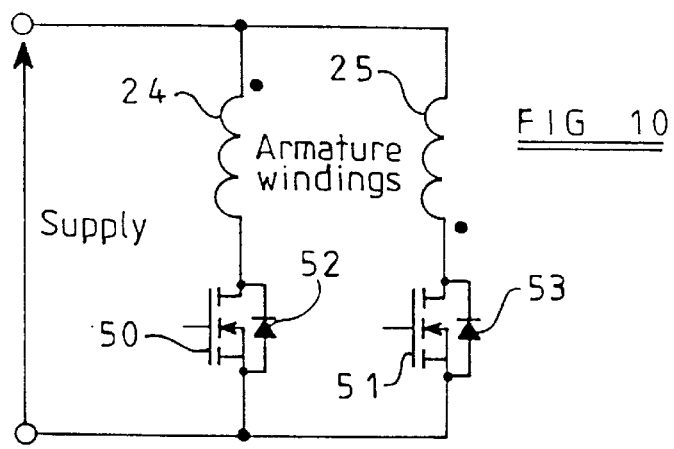

FIG. 10 shows a further possible excitation circuit in which the thyristors are replaced by field effect transistors, and more particularly by two power MOSFETs 50 and 51, which are switched on and off alternately by appropriate switching pulses. Each MOSFET 50 or 51 includes an integral freewheeling diode 52 or 53 so that, as each MOSFET is turned off, the stored magnetic energy in the corresponding coil is coupled to the other coil and flows back through the freewheeling diode of the other MOSFET. Speed control can be achieved by shortening the length of time for which each MOSFET conducts or by respectively switching the MOSFET on and off in each conduction period.

Figure 11:
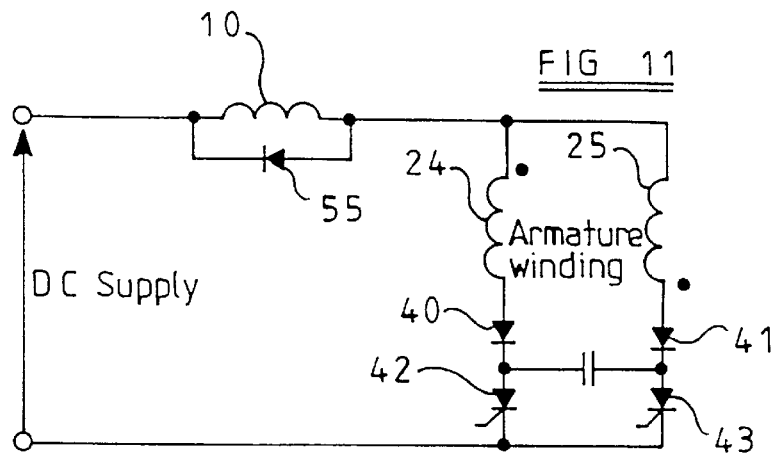

FIG. 11 shows an excitation circuit which is a modification of the circuit of FIG. 7 in which the field winding 10 is connected in series with the armature coils 24 and 25, an optional diode 55 being connected in parallel with the field winding 10 to carry excess current when the field winding current is in excess of the armature current. It is not necessary for special measures to be taken to ensure that the magnitudes of the magnetomotive forces associated with the field and armature windings are similar since it has been found that the motor works well even when there is an imbalance in these magnetomotive forces. The field winding 10 may comprise two closely coupled coils connected in series or parallel, and does not necessarily have to have the same number of turns as the armature winding.

Figure 12:
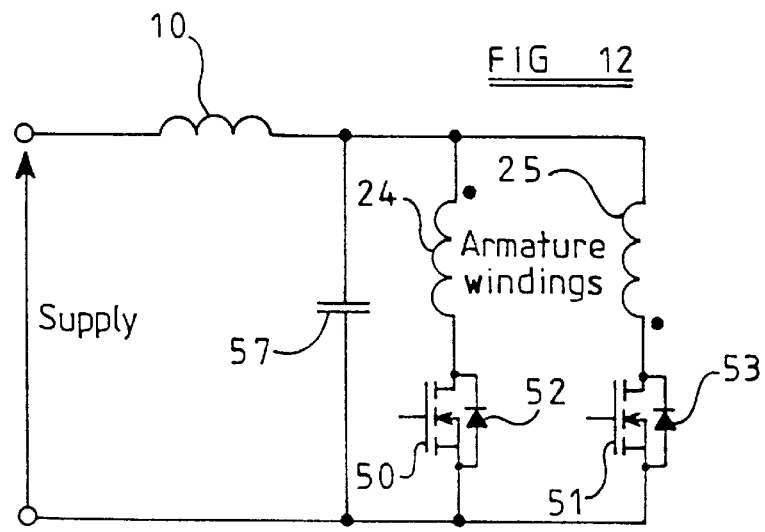

FIG. 12 shows an excitation circuit which is a modification of the circuit of FIG. 10 in which the field winding 10 is connected in series with the armature coils 24 and 25 and a capacitor 57 is connected to the interconnection point between the field winding 10 and the coils 24, 25, as an alternative to connection of a diode in parallel with the field winding 10 as described with reference to the previous figure. The capacitor 57 allows the currents through the field winding 10 and the armature coils 24, 25 to be different. In this case the provision of the capacitor 57 or a diode in parallel with the field winding 10 is essential to allow correct operation of the circuit, whereas the provision of such a capacitor 57 or diode 55 is optional in the circuit of FIG. 11. Connected in this way the field winding 10 and the capacitor 57 combine to form a filter.

The field winding in FIG. 12 could be placed on the a.c. side of a rectifier to act as a filter. In such a case the energisation pattern of the armature coils 24 and 25 would have to reverse with each reversal of the direction of current in the field winding.

The field winding 10 of the motor can be excited in a number of ways, for example by being connected in series with the armature circuit as described above or by being connected in parallel with the armature circuit, or by a combination of these. The armature circuit contains both the armature coils 24 and 25 and the armature switching arrangement. By using a combination of series and shunt connections, it is possible to design the motor to have characteristics which are similar to series and shunt DC motors. It should be noted that, if the field winding 10 is connected in series with the armature circuit, then it is necessary that a path is provided for current flow during times when the armature and field currents are not equal, this path being provided by the diode 55 in FIG. 11 and by the capacitor 57 in FIG. 12. When the field winding is connected in parallel with the armature circuit, an additional circuit arrangement can be added to control the field current and hence the speed of the motor. Such an arrangement could be active (a switching circuit for example) or passive (a variable field resistor for example). Since the field current in the parallel arrangement is small such an arrangement can be provided at very low cost. It is also possible for a field winding, which is used to control the motor speed, to be used in association with a permanent magnet for applying the primary field flux.

Furthermore the similarity between such a machine and a DC machine makes the machine ideal for use as a generator as well as a motor. If the field winding 10 is excited, the voltage induced in the armature can be used as an alternating voltage source, an associated armature circuit, such as that shown in FIG. 4, being required if the generated armature voltage is to be converted to a DC voltage. In this case the switches 28 and 29 could be simply diodes (with their cathodes connected to the armature coils 24, 25) allowing rectification of the induced armature voltage. The switches 28 and 29 could also be MOSFET's, such as 50 and 51 in FIG. 12, which can optionally be controlled in synchronism with the rotor to increase or decrease the amount of generated energy and hence the generated voltage.

Figure 13:
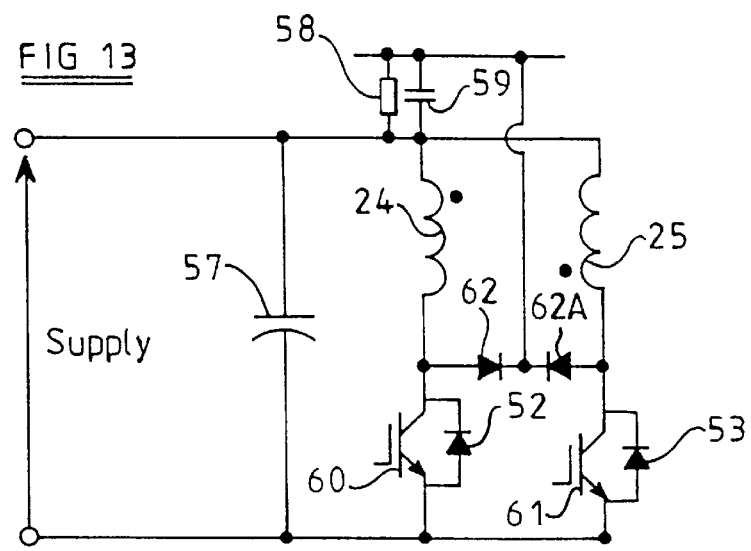

In operation of the circuit of FIG. 12, there is not an instantaneous and lossless transfer of energy from one armature winding to the other at turn off of one of the MOSFET's 50 and 51. In a practical motor there would be some energy which would not be transferred to the second armature winding. Thus, in a practical implementation, it would be necessary to provide a snubber section, such as a resistor 58 and a capacitor 59, to capture this uncoupled energy and prevent it from destroying the switches. FIG. 13 shows a possible modified circuit in which the ends of the armature coils 24 and 25 are connected by diodes 62 and 62A to the capacitor 59 which charges to a voltage above the supply rail voltage. The capacitor 59 is discharged by the parallel resistor 58 so as to dump the energy recovered from the imperfect switching process. In FIG. 13 the switches are IGBT's 60 and 61, although other types of switch could also be used.

Figure 14:
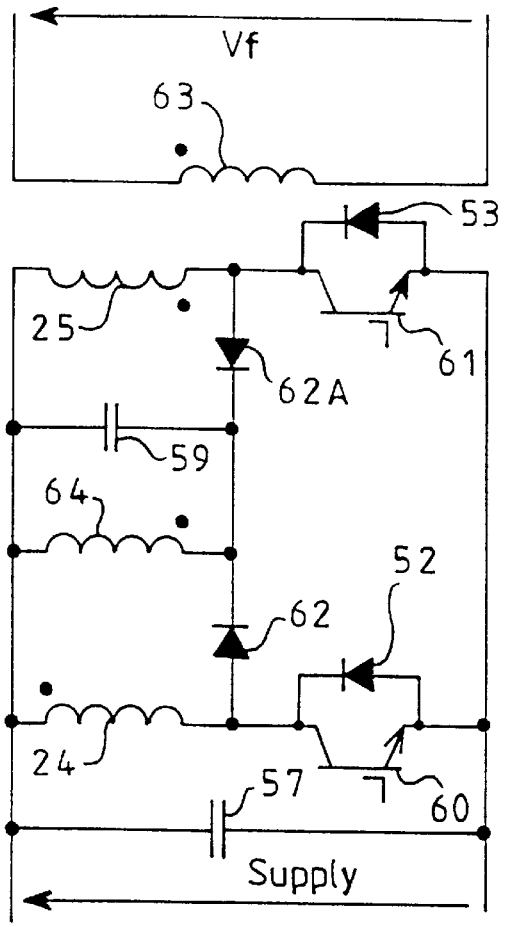

In a variant of the circuit of FIG. 13 the snubber resistor 58 is replaced by all or part of the field winding. For example, in the circuit of FIG. 14, the field winding comprises a coil 63 which is excited by a separate DC source, and a coil 64 which is used to discharge the snubber capacitor 59. The energy is therefore returned to the motor as part of the field excitation circuit.

Whilst the above described excitation circuits make use of thyristor or MOSFET switches, it is possible for the excitation circuit to use any other semiconductor switch or indeed any other type of switch. In the circuit of FIG. 4 the switches shown could even be mechanical, being mounted on the shaft of the motor to open and close in synchronism with the motor position.

Figure 15:
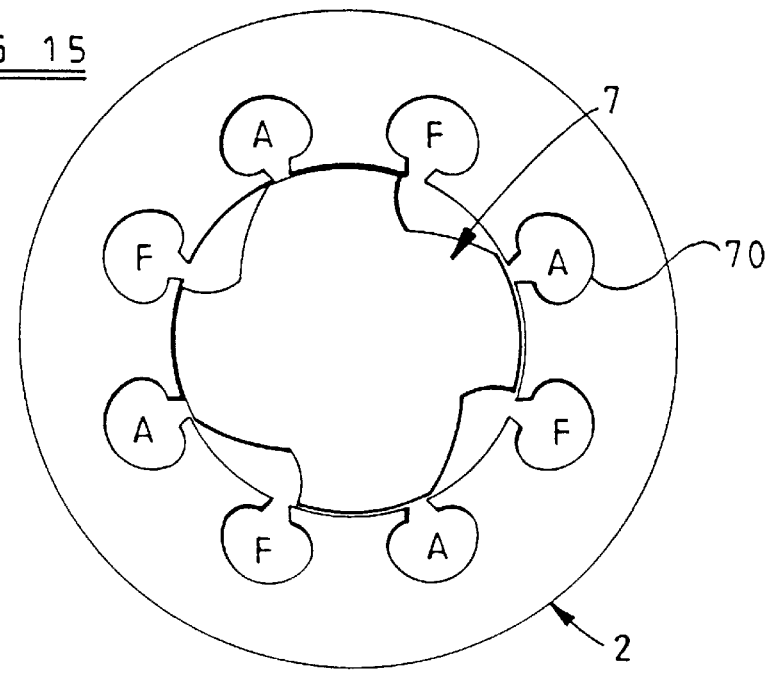
FIG. 15 is a diagram showing a third embodiment of the invention.

FIG. 15 shows a third embodiment comprising a two-phase motor in which the stator 2 has eight poles and the rotor 7 has four poles, this being a variant of the embodiment of FIG. 6 in which the field and armature coils are received in re-entrant recesses 70 in the stator 2 and the rotor poles are shaped so as to have a large pole width sufficient to overlap two adjacent stator poles. Such an arrangement ensures that the reluctance of the magnetic path seen by the windings is approximately constant with rotor position, since there will be a substantially constant angle of overlap between the rotor and stator poles whatever the position of the rotor.

What is claimed is:

1. An electrical machine comprising a rotor (7) without windings, a stator (2) having poles and armature windings (11) wound with a pitch corresponding to a plurality of pole pitches, the stator (2) also including field magnet means (10) for generating a magnetomotive force in a direction extending transversely of the magnetomotive force generated by the armature windings (11), and circuit means (40–47, 50–53, 57–62A) connected to the armature windings (11), characterised in that the armature windings comprise at least two coils (24, 25) which are closely coupled magnetically with a coupling which is substantially independent of rotor position, the coils (24, 25) having active portions at substantially the same angular orientations with respect to the stator and the coils (24, 25) being wound so that the currents in the coils (24, 25) vary in synchronism with rotation of the rotor (7) in such a manner that periods in which a magnetomotive force in one direction is generated by current flow in one of the coils alternate with periods in which a magnetomotive force in the opposite direction is generated by current flow in another of the coils.

2. A machine according to claim 1, wherein the field magnet means (10) is arranged to produce a unidirectional magnetic field.

3. A machine according to claim 1, wherein the field magnet means (10) includes a permanent magnet.

4. A machine according to claim 1, wherein the field magnet means (10) includes a field winding having a pitch corresponding to a plurality of pole pitches.

5. A machine according to claim 4, wherein at least part of the field winding (10) is connected in series with the armature windings(11).

6. A machine according to claim 4, wherein at least part of the field winding (1) is connected in parallel with the armature windings(11).

7. A machine according to claim 5, wherein the circuit means includes current bypass means (55) so as to allow the currents in the armature windings (11) and the field winding (10) to differ.

8. A machine according to claim 1, wherein the circuit means comprises respective switch means (42, 43; 50, 51; 60,61) in series with each coil (24, 25), and timing means for switching the switch means alternately and in synchronism with rotation of the rotor (7).

9. A machine according to claim 8, being a motor, wherein each switch means comprises a thyristor (42, 43), and the circuit means further includes a commutation capacitor (44) connected between the thyristors (42, 43) so that turning on of one of the thyristors by the timing means results in forced commutation of the other thyristor.

10. A machine according to claim 8, being a motor, wherein each switch means comprises a power transistor (50, 51; 60,61) in parallel with a freewheeling diode (52; 53) so that, on turning off of the current flow in said one coil by the associated transistor, current induced in said other coil flows by way of the freewheeling diode associated with the other transistor.

11. A machine according to claim 10, wherein the coils (24, 25) are coupled to a snubber section (58, 59) so that, on turning off of the current flow in said one coil by the associated transistor, the energy which is not coupled to said other coil is discharged to said snubber section (58, 59).

12. A machine according to any claim 1, being a motor, wherein the circuit means is adapted to supply unidirectional current alternately to said one coil to generate said magnetomotive force in said one direction in a first excitation mode and to said other coil in order to generate said magnetomotive force in said opposite direction in a second excitation mode in order to effect continuous rotation of the rotor.

13. A machine according to any claim 2, being a generator, wherein the circuit means is adapted to supply a unidirectional current output in response to generation of currents in said one coil and said other coil during continuous rotation of the rotor.

14. A machine according to claim 1, wherein the field magnet means (10) includes a field winding and further circuit means connected to the field winding for varying the current in the field winding to control the rotor speed.

15. An electrical machine comprising a rotor (7) without windings, a stator (2) having poles and armature windings (11) wound with a pitch corresponding to a plurality of pole pitches, the stator (2) also including field magnet means (10) for generating a magnetomotive force in a direction extending transversely of the magnetomotive force generated by the armature windings (11), and circuit means (40–47, 50–53, 57–62A) connected to the armature windings (11), characterised in that the armature windings comprise at least two coils (24, 25) which are closely coupled magnetically and which have active portions at substantially the same angular orientations with respect to the stator so that the currents in the coils (24, 25) vary in synchronism with rotation of the rotor (7) in such a manner that periods in which a magnetomotive force in one direction is generated by current flow in one of the coils alternate with periods in which a magnetomotive force in the opposite direction is generated by current flow in another of the coils, and further characterised in that the field magnet means (10) includes a field winding having a pitch corresponding to a plurality of pole pitches, at least part of the field winding (10) being connected in series with the armature windings (11), and the circuit means including current bypass means (55) so as to allow the currents in the armature windings (11) and the field winding (10) to differ.

16. An electrical motor comprising a rotor (7) without windings, a stator (2) having poles and armature windings (11) wound with a pitch corresponding to a plurality of pole pitches, the stator (2) also including field magnet means (10) for generating a magnetomotive force in a direction extending transversely of the magnetomotive force generated by the armature windings (11), and circuit means (40–47, 50–53, 57–62A) connected to the armature windings (11), characterised in that the armature windings comprise at least two coils (24, 25) which are closely coupled magnetically and which have active portions at substantially the same angular orientations with respect to the stator so that the currents in the coils (24, 25) vary in synchronism with rotation of the rotor (7) in such a manner that periods in which a magnetomotive force in one direction is generated by current flow in one of the coils alternate with periods in which a magnetomotive force in the opposite direction is generated by current flow in another of the coils, and further characterised in that the circuit means comprises respective switch means (42, 43; 50, 51; 60, 61) in series with each coil (24, 25), and timing means for switching the switch means alternately and in synchronism with rotation of the rotor (7), each switch means comprising a power transistor (50, 51; 60, 61) in parallel with a freewheeling diode (52; 53) so that, on turning off of the current flow in said one coil by the associated transistor, current induced in said other coil flows by way of the freewheeling diode associated with the other transistor.

17. A motor according to claim 16, wherein the coils (25, 25) are coupled to a snubber section (58, 59) so that, on turning off of the current flow in said one coil by the associated transistor, the energy which is not coupled to said other coil is discharged to said snubber section (58, 59).

* * * * *